United States Patent [19]
Fisher et al.

[11] Patent Number: 5,343,384
[45] Date of Patent: Aug. 30, 1994

[54] METHOD AND APPARATUS FOR CONTROLLING A SYSTEM OF COMPRESSORS TO ACHIEVE LOAD SHARING

[75] Inventors: Alvin J. Fisher, Murray; Troy S. Smoot; Daniel E. Kincer, both of Mayfield, all of Ky.

[73] Assignee: Ingersoll-Rand Company, Woodcliff Lake, N.J.

[21] Appl. No.: 960,076

[22] Filed: Oct. 13, 1992

[51] Int. Cl.$^5$ .................. G05B 15/00; G05D 23/32; F04B 41/06

[52] U.S. Cl. .................. 364/133; 364/510; 62/157; 417/8

[58] Field of Search .............. 364/133, 509, 510; 62/81, 180, 175, 199, 140, 156, 117, 228.3, 157, 510; 307/39; 417/8, 38

[56] References Cited

U.S. PATENT DOCUMENTS

| | | | |
|---|---|---|---|
| 4,152,902 | 5/1989 | Lush | 62/157 |
| 4,384,462 | 5/1983 | Overman et al. | 62/175 |
| 4,502,842 | 3/1985 | Currier et al. | 417/8 |
| 4,580,947 | 4/1986 | Shibata et al. | 417/8 |
| 5,123,256 | 6/1992 | Oltman | 62/175 |
| 5,231,846 | 8/1993 | Goshaw et al. | 62/175 |

OTHER PUBLICATIONS

Instruction and Installation Manual for the Ingersoll Rand Two to Eight Compressor Control Software 1X13132, dated Sep. 6, 1990.

*Primary Examiner*—Jerry Smith
*Assistant Examiner*—Jim Trammell
*Attorney, Agent, or Firm*—Victor M. Genco, Jr.

[57] ABSTRACT

Load sharing is achieved in a multiple compressor system by a program in a computer which sends signals to, and receives data from, a microcontroller located at each compressor. One compressor, designated as the lead compressor, furnishes its operating parameters, via the computer, to all the other, lag, compressors. The operating parameters include inlet valve position and bypass valve position of each compressor and the microcontroller controls the actuatation of both valves. When system demand decreases, compressors are gradually unloaded, and then stopped to go off-line. When system demands increase, compressors are first started, and then gradually loaded before going on-line. Compressors go both on-line and off-line subject to certain time delays so that compressors are gradually added to, or shed from, the load. To equalize running time, all compressors in the system may undergo a periodic rotation and compressors go off-line in reverse order that they came on-line.

7 Claims, 12 Drawing Sheets

METHOD AND APPARATUS FOR CONTROLLING A SYSTEM OF COMPRESSORS TO ACHIEVE LOAD SHARING

COPYRIGHT NOTICE

A portion of the disclosure of this patent document contains material which is subject to a claim of copyright protection. The copyright owner has no objection to the facsimile reproduction by anyone of the patent document or the patent disclosure, as it appears in the Patent and Trademark office file or records, but otherwise reserves all other rights whatsoever.

1. Field of the Invention

This invention relates to a control system and method for controlling a plurality of compressors; more particularly, the invention relates to a control system and method for a plurality of compressors which provides for efficient load sharing between the plurality of compressors.

2. Background and Objects of the Invention

Typically, a plurality of compressors are assembled to supply compressed air to a given industrial facility. In such assemblies, it is generally desirable to have each one of the plurality of compressors operating at, or near, similar operating points so that the load is shared generally equally between each one of the compressors. Furthermore, it is also desirable to shed compressors from the assembly when the load decreases so that the demands of the facility can be satisfied with fewer running compressors in the assembly; by the same token, whenever the demands of the load exceed the available supply from the on-line compressors, additional units have to be brought into the system so that costly facility shutdowns due to lack of compressed air are avoided.

Prior art systems which have addressed load sharing have done so particularly by controlling certain operating parameters of the compressors, such as, e.g., the amount of air flowing, the pressure of the supplied air, etc.

In the case where the compressors are of the centrifugal type, the principal operating parameters are pressure and flow rate, both governed by control of the inlet valve to a centrifugal compressor, and the bypass valve thereof.

In other words, the inlet valve is used to control the flow rate of the compressor (at a certain designated or desired pressure) and, when the required control is below the range of control exercisable by the inlet valve, engagement of an auxiliary control represented by a controlled opening, or closing, of the bypass valve which allows the compressor to dump excess flow into, for example, the atmosphere, is used. It is clear that by-passing the compressor, and dumping air flow into the atmosphere (rather than delivering it to the load) represents a waste of energy.

Accordingly, is a primary object of this invention to provide apparatus and method for controlling a plurality of centrifugal compressors.

Those compressor systems of the prior art which have attempted to equalize the load between a plurality of compressors have generally been unable to consistently, and repeatedly, equalize both compressor output, and total running time, because, in part, inadequate attention was paid to characteristics of such compressor systems. For example, compressor systems of the prior art have not followed a rigorous routine for bringing compressors on-line, when demanded, and take them off-line when there is reduced demand. Haphazard control over the compressor units added to, or shed from, the system may lead to unequal distribution of either load, or total running time, as between the various compressors.

Accordingly it is another object of this invention to provide a method and apparatus for controlling a plurality of compressors so that both load, and total running time, of a plurality of compressors are equalized.

It will be appreciated that any system utilizing a plurality of compressors to supply the air demands of a facility, and which is controlled by load sharing systems and methods, must avoid an overly tight control loop which would cause premature additions to, or removal of, individual compressors to and from the system. Momentary fluctuations in air demand must be allowed without triggering the addition, or removal, of compressors. For example, electric motors which are commonly used as the prime mover to drive a compressor, are limited in the amount of restarts allowed for a given unit of time. Thus, if an electric motor to drive a compressor has come on line in the system it is desirable to prevent that same electric motor and its associated compressor from coming off-line for a given period of time to thus prevent a premature restart.

Accordingly, it is another object to this invention to provide apparatus and method for equalizing load sharing and running time between a plurality of compressors in a system which controls both the coming on-line, and going off-line, of a given compressor gracefully (i.e. in slow increments) and not abruptly.

Any load-sharing method and apparatus must also take into account the fact that compressors in general, and centrifugal compressor in particular, have operating conditions which are at the extremities of their performance envelopes. For example, centrifugal compressors are known to "surge", a condition characterized by reverse flow in the compressor, which not only disrupts the flow of air from the compression process, but which may also damage the compressor elements.

Accordingly, it is another object of this invention to provide a method and apparatus which allows load sharing between a plurality of compressors without forcing any of the compressors into surge conditions.

The foregoing illustrates limitations known to exist in present controllers for centrifugal compressors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a load-sharing system and method in which a plurality of compressors are caused to operate at largely similar, if not identical, operating points and wherein compressors can be either taken off-line, or be put on-line, so long as no single compressor, which has been put on line, can be taken off-line unless a desired and selectable time period has elapsed.

In accordance with another aspect of the invention, this is accomplished by providing a method and apparatus for controlling a plurality of compressors in a load-sharing system in which all compressors, including both lead and lag compressors (as that term will be explained below) can be rotated so that compressor usage is equalized for all of the compressors.

In accordance with yet another aspect of the invention, this is accomplished by providing a method and apparatus for load sharing between a plurality of compressors which follows a rigorous system for taking compressors off-line, and bringing compressors on-line. To assure that a rigorous set of sequencing rules are followed, the sequencing operations are preferably arranged in a first-in/last-out mode.

In yet another aspect of the present invention, this is accomplished by providing a method and apparatus for compressor control wherein one of the compressors, designated as the lead compressor from which all other compressors (known as the lagging compressors) take their operating cues, may, if it is the only compressor which is loaded (as that term will be defined below) operate in an energy saving mode, known as the auto dual mode.

The foregoing and other aspects, objects, features and advantages of the invention will be apparent from the following more particular description of several preferred embodiments of the invention, as illustrated in the accompanying drawings.

DETAILED DESCRIPTION

Figure 1:
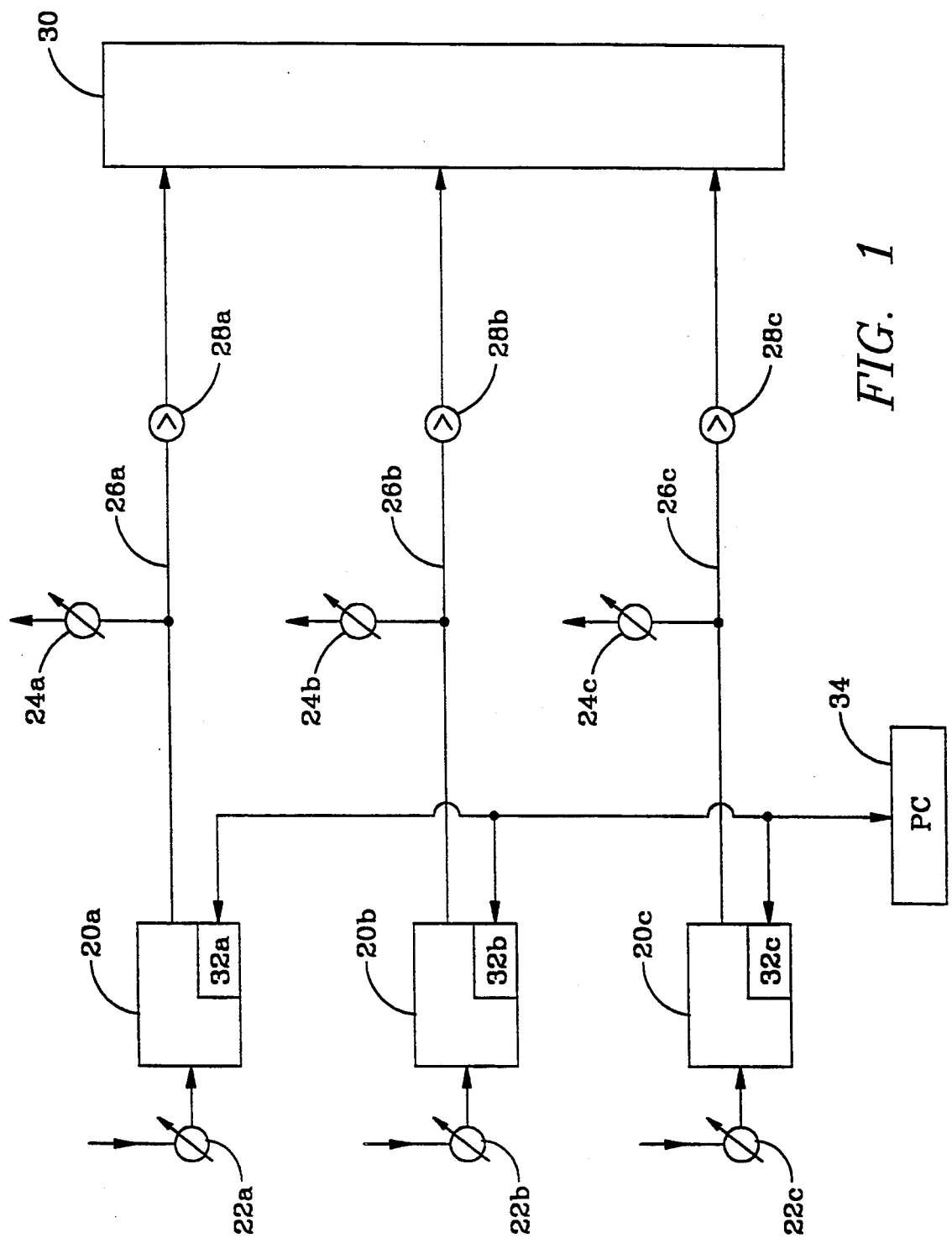
FIG. 1 is a schematic block diagram of the invention showing a plurality of compressors supplying a common load.

With reference to FIG. 1, there is shown a plurality of compressors 20a-c. Each of the compressors 20a-c is provided with respective adjustable inlet valves (IV), 22a-22c. Furthermore, each of the respective compressors 20a-c is also provided with respective adjustable bypass valve (BV) 24a-24c. Each one of the compressors 20a-20c is provided also with respective conduits 26a-c feeding into respective one way check valves 28a-28c, prior to supplying a manifold 30 with compressed air suitable for supplying an industrial facility.

Each one of the respective compressors 20a-c has associated therewith respective microcontrollers 32a-32c for controlling the respective adjustable inlet valves (IV) 22a-c and the respective adjustable bypass valves (BV) 24a-c. Each microcontroller 32 may use an Intel 8051 chip (Intel is a trademark of the Intel Co.) as its basis.

The respective microcontrollers 32a-c communicate with a computer, PC 34, by way of a bidirectional network so that certain control functions, as will be detailed below, of the respective microcontrollers 32a-c are controlled by a program in PC 34.

Microcontrollers 32a-c also function, under certain conditions, as will be detailed below, to control both the respective IV's 22a-22c, and the respective BV's 24a-24c of each compressor. The microcontrollers 32a-c also provide the program resident in PC 34 with certain operating information of each of the respective compressors 20a-20c.

In accordance with the load-sharing aspects of the system, one of the compressors 20a-20c is designated as the "lead" compressor from which certain data is used to control the remaining (lag) compressors, which take their operating cues from the lead compressor under the control of a program stored in PC 34. For example, if compressor 20a is designated as the "lead" compressor, the remaining compressors 20b and 20c will track the operating parameters of lead compressor 20a. Thus, for example, if, as in a manner to be subsequently described, IV 22a of lead compressor 20a assumes a certain position, this position is communicated from microcontroller 32a to PC 34 which then instructs microcontrollers 32b and 32c to adjust their respective IV's 22b and 22c to assume a similar position.

That is, as microcontroller 32a goes through one of its routines, as described with reference to FIG. 2, which leads to an adjustment of IV 22a, the microcontrollers 32b and c of the "lag" compressors 20b and 22c will likewise cause their IV's 22b and 22c to follow the same routine.

Figure 2:
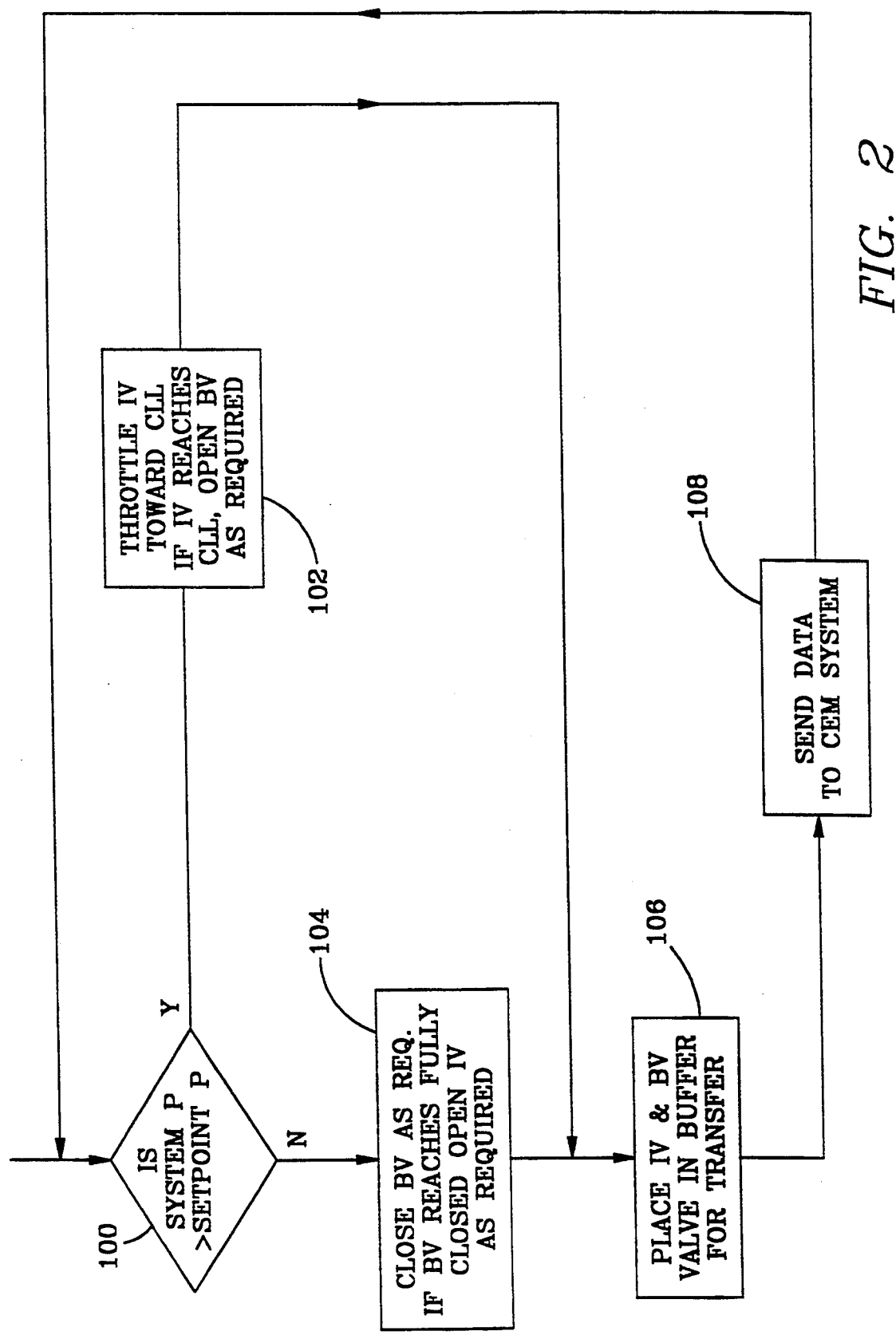
FIG. 2 is a flow chart of the control routine of a so called lead compressor.

With reference to FIG. 2, a lead compressor, such as 20a, is caused to undergo a repeated routine in which the system pressure 'P', as it exist in manifold 30, is continually compared to the set point, or desired, pressure 'P'. Such a comparison is performed in step 100 of the flow chart illustrated in FIG. 2. If the system 'P' is greater than the set point 'P', a yes decision causes the particular microcontroller 32 to execute, at step 102 of the control routine, a process which calls for dropping the IV of the lead compressor toward a position CLL (current limit, low) beyond which the IV of a particular compressor cannot be adjusted. If system 'P' is still greater than the set point 'P', step 102 will no longer adjust the position of IV, but will now start to open the bypass valve, BV, of a given compressor.

If the comparison of step 100 yields a no, thereby indicating that the system pressure is below the desired level, step 104 calls for, first, closing the bypass valve of a compressor until it is fully closed whereafter, and next, if the system pressure is still not up to the desired, set point level, step 104 will further cause the inlet valve, IV, to be opened until the desired pressure is achieved.

Whether looping through step 102 or step 104, step 106 is executed to place the position of both the inlet valve (IV) and position of the bypass valve (BV) of the lead compressor in a buffer for transfer.

If the CEM (Centac Energy Master—a tradename of the Ingersoll Rand Co.) program is present and operating, the IV and BV values of the lead compressor, arrived at in steps 102 or 104, are sent to the CEM program, in step 108, the CEM program being resident in PC 34 (see FIG. 1).

To summarize, the system of the invention calls for a microcontroller 32 of a lead compressor, e.g. 20a, to continually compare the system pressure with the desired pressure and cause corresponding adjustments, either up or down, in first, position of the inlet valve, and subsequently, in the position of the bypass valve, so that these changes can be passed to the remaining compressors in the system, the lag compressors, by way of the CEM program stored in PC 34.

As those skilled in the art will know, if a centrifugal compressor has its inlet throttle valve, IV, adjusted closed beyond a certain point, known as the CLL (current limit, low) point, possibly undesirable surge conditions may be caused. Accordingly, the IV position of a compressor is never forced below the CLL (current limit, low) level of the electrical motor driving the compressors. (It is noted that the current flow through the motor driving the compressor is directly related to the air flow through the compressor.) If still further pressure reduction is to be achieved in any one compressor, control thereof is achieved by opening the bypass valve, rather than further adjustment in the IV position. The CLL position is measured by the current flowing through the electric motor driving a compressor below which further adjustments of IV is not allowed. Thus, a particular microcontroller 32 associated with each compressor will, if faced with the CLL limit, disregard any further instructions, from the CEM program stored in PC 34 to further close IV, and will instead start to open the bypass valve, BV, of the particular compressor to further reduce the system pressure.

When system pressure is below the desired set point pressure, a "reverse" action of the previous routine is followed by each microcontroller 32 to first, close the bypass valve, as required, and thereafter, if that is insufficient, open the inlet valve, IV, of a particular compressor, as represented by step 104 in FIG. 2.

Figure 3:
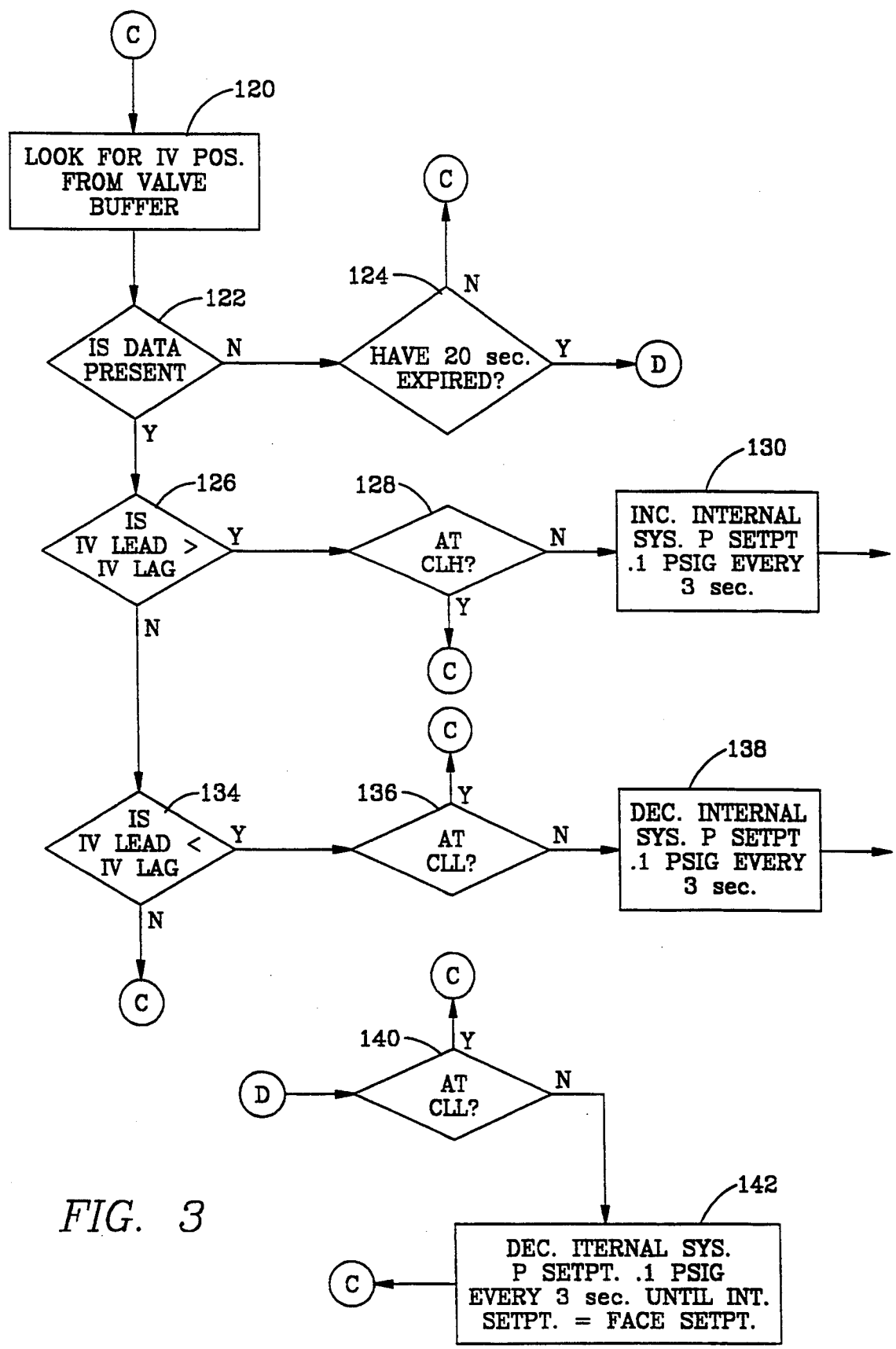
FIG. 3 is a flow chart of the control routine of a lag compressor.

With reference to FIG. 3, there is illustrated the flow chart of the routine followed by a "lag" compressor, as executed by the microcontroller 32 associated with each compressor 20.

The routine begins with step 120 which calls for the microcontroller 32 to look for the IV position (of the lead compressor) in the value buffer. In decision step 122 the microcontroller 32 ascertains whether data is present in a value buffer (not shown) from PC 34. If no data is present in the value buffer, the control routine proceeds to step 124 to evaluate whether 20 seconds have expired between the last data sent to the value buffer. If 20 seconds have not expired, the routine returns to step 120 and will continue to do so until either data is present, or the 20 seconds have expired.

If 20 seconds have expired, step 124 will lead to the subroutine D, to be described subsequently.

If, after the step 122, it is ascertained that data is present in the value buffer of the microcontroller, step 126 evaluates whether the inlet valve (IV) position of the leading compressor is greater than the inlet valve (IV) position of the lag compressor. If step 126 results in a yes answer, the routine proceeds to step 128 which asks whether the compressor controlled by microcontroller 32 is at CLH (current limit high). This step ascertains whether the lag compressor is already fully loaded so that any further adjustments in the IV of the lag compressor are futile, since the microcontroller will not allow such adjustments to be made.

Therefore, if the lag compressor is indeed at its high limit current level, and the comparison yields a affirmative decision, the routine returns to step 120.

If the comparison at step 128 determines that the lag compressor being checked by its own microcontroller is not at CLH, the routine goes on to step 130, in which the microprocessor increases the internal set point pressure by 0.1 psig every 3 seconds until the desired valve position is achieved.

If the comparison at step 126 indicates that the IV position of the lead compressor is less than the IV position of the lag compressor, a no decision leads to step 134 which compares the IV position of the lead compressor with the IV position of the lag compressor to determine whether the lead compressor IV position is less than the IV position of the lag compressor. If this comparison results in a yes decision, the routine proceeds to step 136 where a decision is made about the throttling of the lag compressor. If the determination that a lag compressor is at its CLL limit (i.e. it is at its minimum load state) is made, the routine jumps to step 120. A no decision leads to step 138 where the internal system pressure set point is decreased point 1 psig every three seconds until the desired valve position is achieved.

At the conclusion of the routine in step 138, the program returns to step 120. If the comparison executed at step 136 yields an affirmative decision, the routine proceeds back to step 120 to reexecute the routine.

If the decision at step 134 yields a negative conclusion, the program loops back to the beginning step 120 of this routine.

Figure 4:
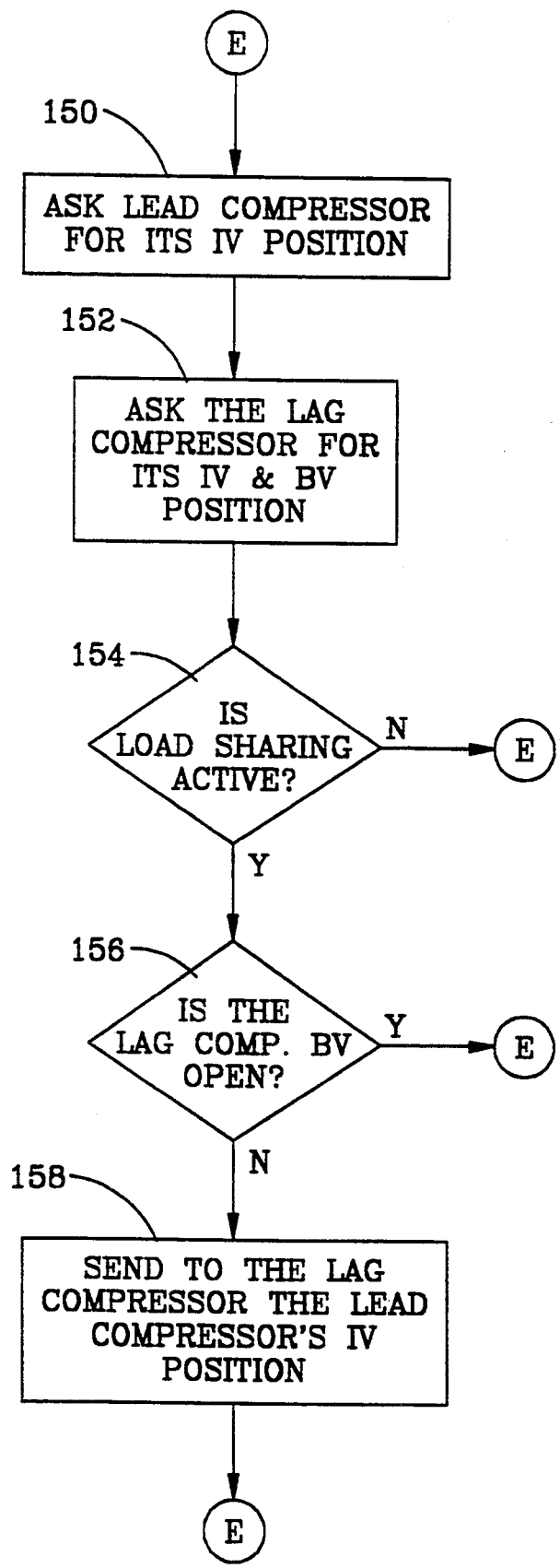
FIG. 4 is a flow chart of the control routine of a load sharing system.

It was noted that if the comparison at step 124 yields a yes answer, the routine proceeds to step D which calls, at step 140, for a comparison whether the particular lag compressor is at its minimum load point, namely CLL (current limit low). If the decision is affirmative, no further adjustments are made and the routine returns to step 120. If, however, it is determined at step 140 that the lag compressor is not at CLL (i.e. there is a further adjustment possible) the negative decision at this point will lead to step 142 which calls for the decrease of the internal system pressure set point by 0.1 psig every three seconds until the internal system set point for pressure equals the set point for the pressure established on a control panel (not shown) of microcontroller 32. At the conclusion of the adjustment process in step 142, the routine returns to the beginning of the With reference now to FIG. 4, there is illustrated the routine by which PC 34 (see FIG. 1) communicates the position of the IV (inlet valve) of the lead compressor to the lagging compressors. The routine commences with step 150 in which the PC 34 polls the lead compressor for its IV position. Subsequently, at step 152, the program in PC 34 asks the lag compressor for its IV (inlet valve) and BV (bypass valve) position. Once this data has been determined, the routine proceeds to step 154 where it is determined whether the load sharing system is in operation. If it is not, the routine returns to step 150. If, however, the load sharing system is active the routine proceeds to step 156 where the program determines whether the BV (bypass valve) of the lag compressor is opened. If it is opened, (which indicates that no further adjustments of the inlet valve of the lag compressor are possible), the routine loops back to step 150 so that the compressor is not forced into a surge condition. If, on the other hand, the BV (bypass valve) of the lag compressor is not opened (thereby indicating that further adjustments of the IV (inlet valve) are possible), the program proceeds to step 158 which then communicates to the lag compressor the position of the IV (inlet valve) of the lead compressor. This transmittal of the lead compressor inlet valve position to the microcontroller of the lag compressor will cause the microcontroller of the lag compressor to adjust, i.e. modulate, the inlet valve position of the lag compressor to match the inlet valve position of the lead compressor.

Figure 5A:
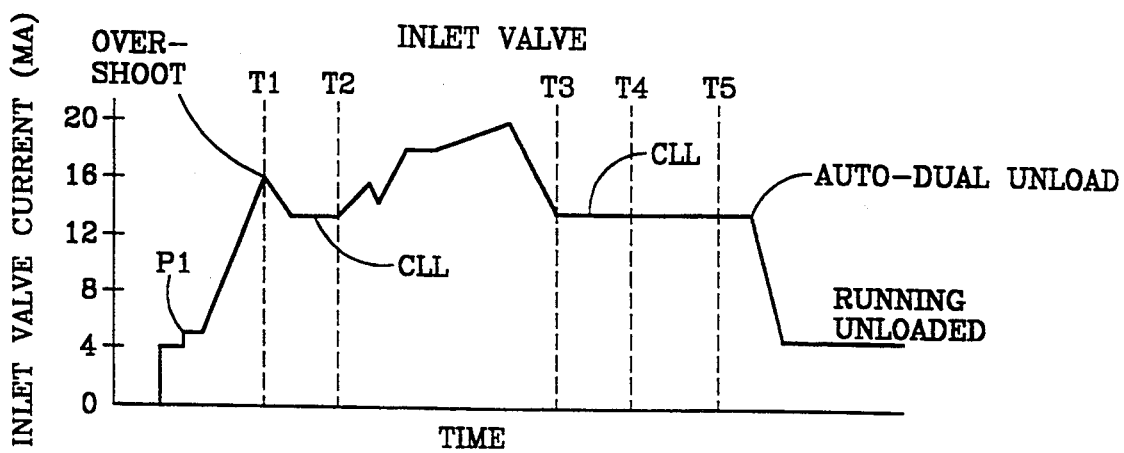
FIG. 5 illustrates the control activities on a given compressor in which both inlet valve and the bypass valves are controlled.
Figure 5B:
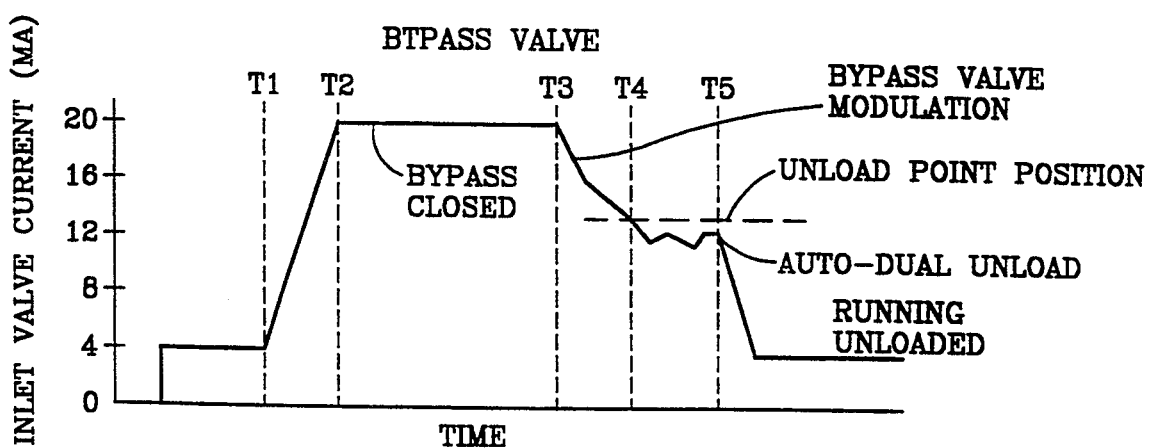

With reference to FIG. 5, a typical cycle of both inlet valve and bypass valve positions in a particular compressor are described.

The plot of the inlet valve position is illustrated by graphing the current to the inlet valve controller (to thereby indicate its position) on the vertical scale (which ranges between a minimum of 4 milliamps up to a maximum of 20 milliamps) and time on the horizontal scale. As time progresses, power is turned on to the compressor motor. This will cause the compressor to gradually start over a certain time interval which brings the compressor system first up to a inlet valve portion P1, while at the same time, the bypass valve is fully opened because its microcontroller is also at the unloaded position of four milliamps (ma). As the current to the inlet valve controller is increased, the compressor will draw more driver current so as to arrive at its minimum load position, as reflected by the CLL position, representing the minimum load current through the motor driving the compressor.

After the compressor (subsequent to an overshoot— shown in a greatly exaggerated manner for the purposes of clarity—when CLL position is verified during the start-up phase) has stabilized at the CLL position of the compressor, at time T2, the inlet valve is activated and modulated, or controlled, through various settings in accordance with the particular system set point pressure and the demands of the load. If the control sequence, as it eventually will, causes the inlet valve to return to a position at which the compressors runs at CLL (current limit low) at T3, the bypass valve, which had been closed, is activated to start controlling system pressure. After having reach the unload point position, at T4, an unload routine is commenced following a delay equivalent to the difference between T4 and T5, after which the compressor, at T5 and beyond, has both a minimum inlet valve position as well as a bypass valve open position, which represents the unloaded state of a compressor. It is to be noted that FIG. 5 illustrates the operation of both inlet and by-pass valves when the compressor is being operated in a so-called "auto-dual" mode which applies only to the lead compressor and only when it is the only compressor loaded. A regular, so called "modulate" mode is applicable to all compressors not operating in the "auto dual" mode, with the only difference between the "auto dual" mode and the "modulate" mode being that in the "modulate" mode the unloading (as well as re-loading) is controlled by the CEM program while in the "auto dual" mode, unloading (and reloading) is controlled by the microcontroller, and not the CEM program.

With reference now to FIGS. 6A–6F, the various steps in a load sharing routine are shown by a series of flow charts.

Figure 6A:
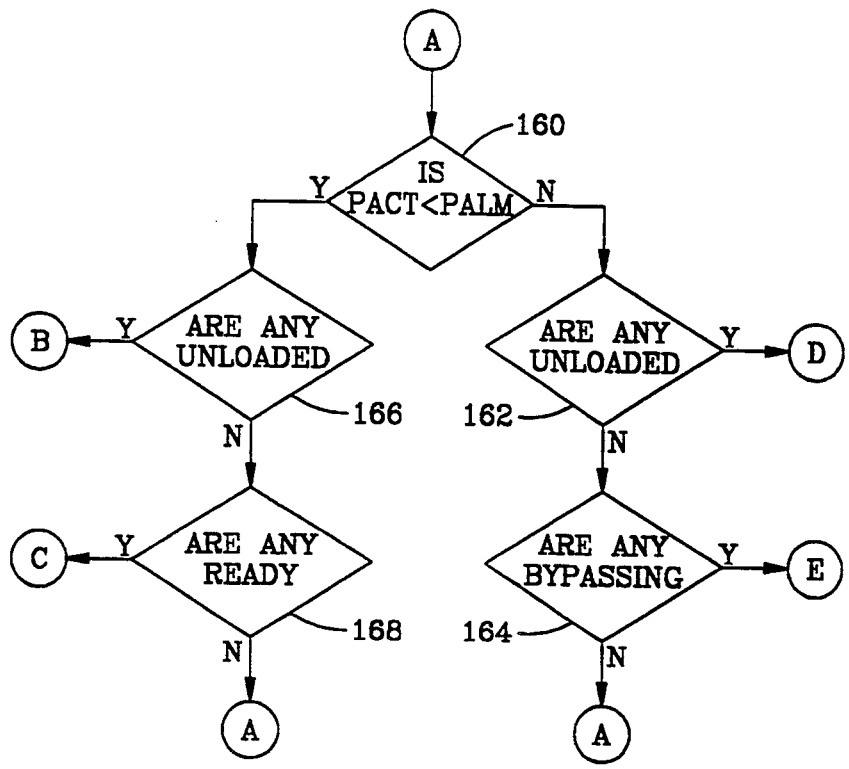
FIGS. 6A-6F show flow charts utilized in the compressor control system according to the invention.

As illustrated in FIG. 6A, the routine commences with step 160 which determines whether the system air pressure is less than the system alarm pressure so that corrective action may be taken. If the decision at step 160 yields a negative answer (i.e. the actual pressure is above the alarm pressure), the routine proceeds to step 162 which determines whether any compressors are "unloaded". An unloaded compressor is a compressor the inlet valve of which is set at a position P 1 and the by-pass valve of which is set 100% open.

If the routine at step 162 determines that a particular one, or several, compressors are unloaded (as defined above) the routine proceeds to step D, to be describe below.

If the comparison at step 162 determines that no compressor is unloaded, the routine proceeds to step 164 which determines whether any compressor, or compressors, are bypassing i.e. have their bypass valves open, even partly so. If its determined in step 164 that the bypass valve of any compressor, or compressors, are open, the routine proceeds to step E to be subsequently described. If the determination at step 164 yields a negative result, the routine loops back to commence step 160.

If the determination at step 160 is affirmative, the routine proceeds to step 166 to determine whether any compressors are unloaded. If the decision is affirmative, after step 166, the routine proceeds to step B, to be described below.

If the routine at step 166 determines that there are no unloaded compressors, the routine proceeds to step 168 to determine whether any compressors are ready. If the decision after step 168 is affirmative, the routine proceeds to step C, to be described below, while if the results of step 168 are negative, the routine proceeds to loop back to step 160.

In summary, a routine illustrated in FIG. 6A determines whether compressors can be taken off-line, or whether compressors should be added on-line. In making its decision, the routine concentrates first on any unloaded compressors, i.e. compressors which are already running, however in an unloaded mode. If the system pressure is greater than the alarm pressure (which may be set at any desired point—in the compressor's operating range—depending upon the facility) any unloaded compressors are candidates for a stop procedure and any compressors not fully loaded, but who are bypassing, become candidates for removal from the system. If, on the other hand, the system pressure is below the alarm pressure, the routine of FIG. 6A checks first for any unloaded (by definition, running) compressors to bring them online, and, if none are running in an unloaded state, the search continues for a compressor ready to start up such a compressor becomes a candidate to be loaded into the system.

Figure 6B:
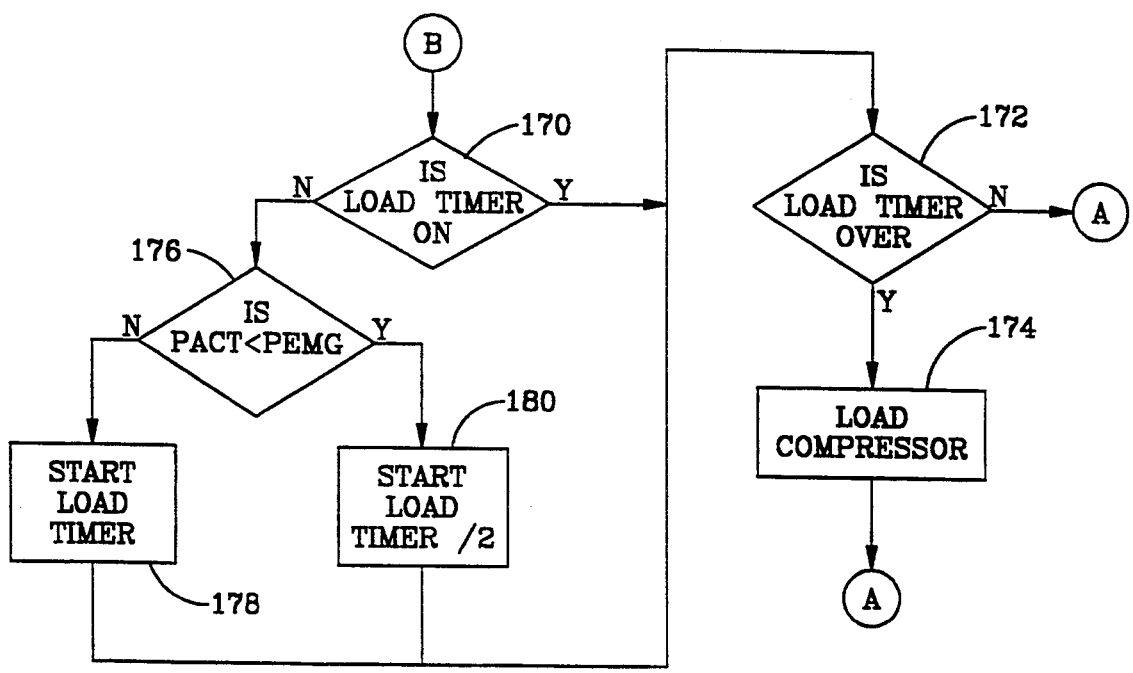

With reference to FIG. 6B, there is illustrated the routine of the program which is called by an affirmative decision in step 166 of FIG. 6A. The routine of FIG. 6A has determined that system pressure is below the alarm level and has determined that any one (or more) of the system compressors is running unloaded. To prevent premature loading of a compressor in response to momentary, brief, fluctuations in the system pressure which can pass quickly, the routine in FIG. 6B, starts with step 170 to determine whether a timer (not shown) is on. If a load timer has been started (to delay the start of loading a compressor), the routine proceeds to step 172 and will not proceed to step 174, to load the compressor, until the load timer has counted down to zero. Until such time, the program will loop back to step 160 in FIG. 6A. If the load timer, whose timing can be adjusted to suit a given facility, has counted down, the routine proceeds to step 174 to load a compressor by, first, closing the bypass valve, and second, after the bypass valve has closed, opening the inlet valve of a given compressor. If, after execution of step 170, it is determined that the load timer is not on, the routine proceeds next to step 176 where it is determined whether the system pressure (Pact) is less than the emergency pressure for the system, which is set to be below the alarm pressure. If the results of step 176 are affirmative, i.e. the system pressure is below the emergency pressure, step 180 starts a load timer 180 which is loaded at half the contents of the load timer when the system pressure is not less than the emergency pressure. Basically, steps 178 and 180 determine, based on the comparison of the system pressure with the system emergency pressure set point, whether or not a compressor should begin loading rapidly or more slowly. It is to be noted, however, that even if the system pressure is below the emergency pressure set point, a delay in loading is still called for, although the load timer calls for a shorter interval in such case.

Figure 6C:
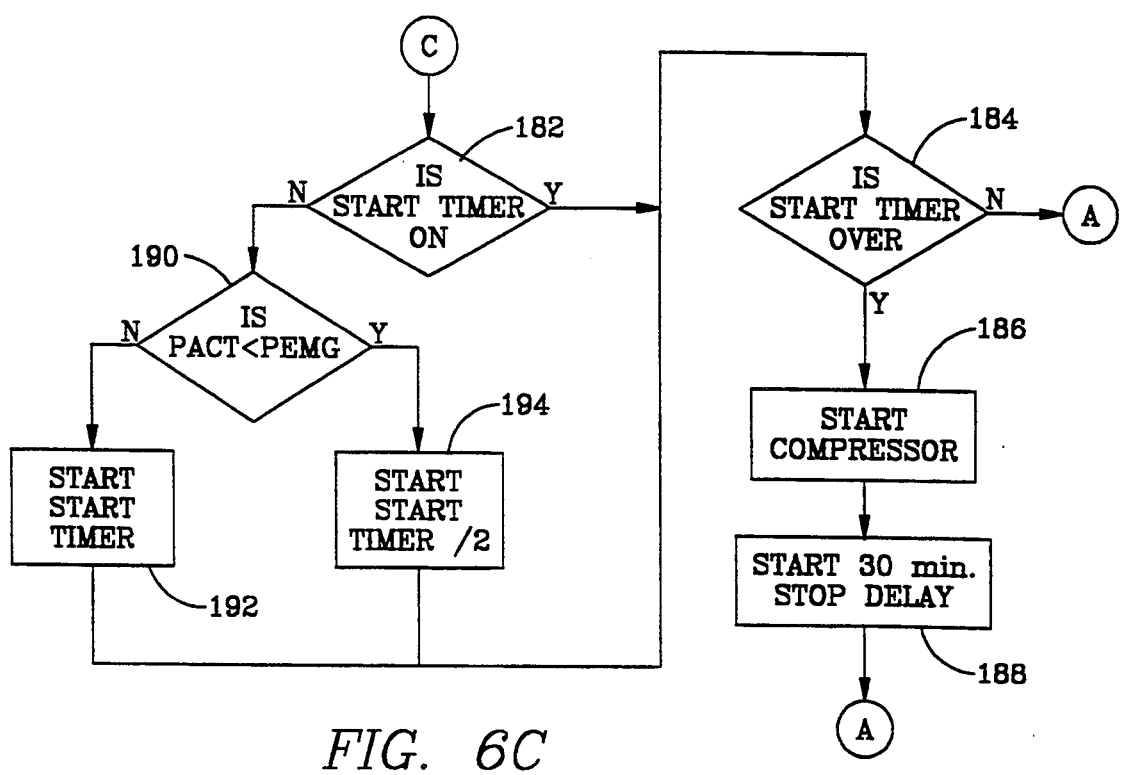

With reference to FIG. 6C, there is illustrated the routine used for starting a compressor if, in accordance with FIG. 6A, the routine there described has failed to find any unloaded compressors. The routine in FIG. 6C, having found no unloaded compressors by the routine shown in FIG. 6A, now commences, in step 182, to determine whether the start timer is on. If it is, the routine proceeds to step 184 to determine whether the start timer is over; if not, the routine returns to step 160 shown in FIG. 6A. If the result from step 184 is in the affirmative, a compressor is started in step 186 and a thirty minute stop delay timer is also activated in step 188, after which the program returns to step 160, in FIG. 6A. While the routine in step 188 is described with reference to a thirty minute period, this time interval can be selectively adjusted by the user of the system to be greater, or smaller, than thirty minutes. The purpose of step 188 for any particular compressor is to prevent a restart of the same compressor when intervening events have caused it to be unloaded, and then stopped, unless the time interval specified in the stop delay timer 188 has elapsed. This step simply prevents too many hot starts of the electric motor driving the compressor so that electric motor durability is maintained.

If the results of step 182 are negative, the routine proceeds to step 190 where an inquiry is made about system pressure and its relationship to the emergency pressure set point of the system. Depending upon the results of step 190, the routine proceeds either to step 192 to start a start timer, or it proceeds to step 194 by starting a more rapidly counting start timer so that the compressor can be started with less of a start timer delay.

Figure 6D:
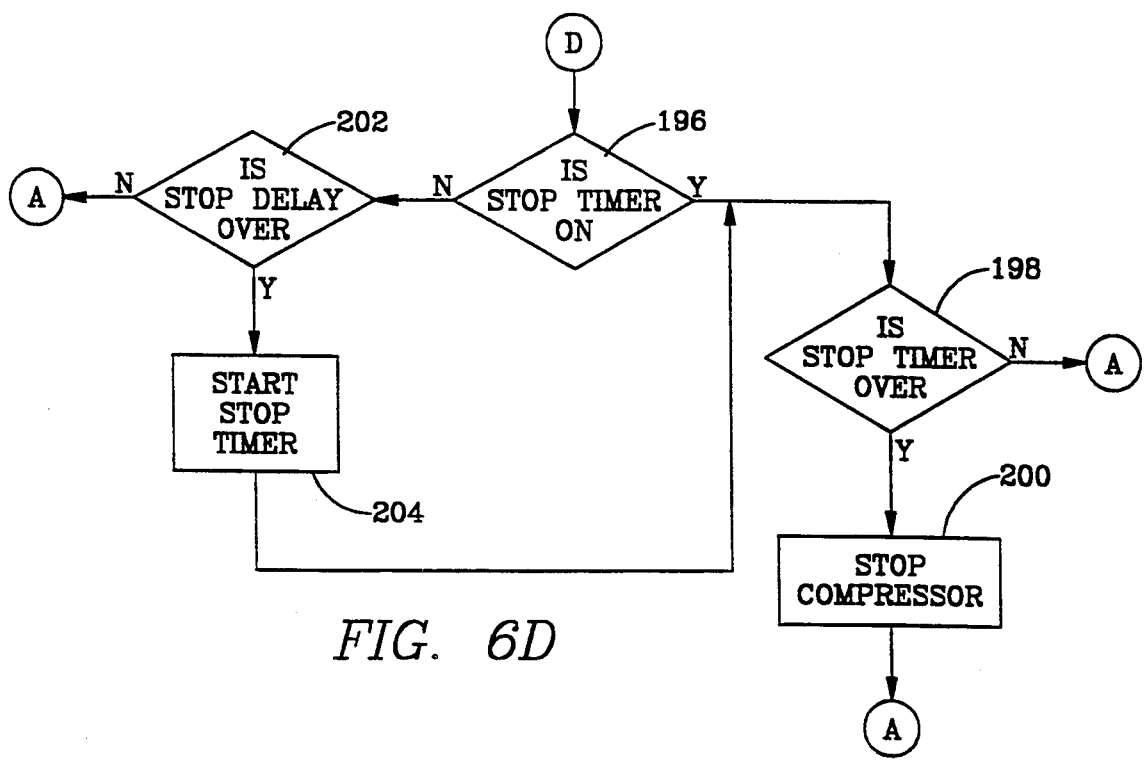

With reference, now, to FIG. 6D, there is illustrated the routine which follows an affirmative determination from step 162, shown in FIG. 6A. If, in accordance with the routine described in FIG. 6A, system pressure is not below the alarm level, and the routine of FIG. 6A, has identified, in step 162, that some compressors are unloaded such compressors are targets for being taken off line. However, the routine in FIG. 6D prevents an immediate shutdown of the compressor until certain timing intervals have elapsed.

If the results of the routine, after execution step 196 are negative, the routine proceeds to step 202 to determine whether or not the stop delay timer, started at step 188 of FIG. 6C, is over. If it is not, the routine prevents the start up of a stop timer and instead loops back to step 160 of FIG. 6A. If however, the stop delay has expired, the routine proceeds to step 204 where a stop timer is started. Not until the stop time is over, as determined by step 198, does the routine proceed to step 200 and stop the compressor.

In step 196, the routine determines whether the stop timer is on, and, if it is, proceeds to step 198 to determine whether the stop timer is over, i.e. has counted out. If the results of step 198 are affirmative, step 200 executes a stop compressor routine, after which the program loops back to step 160 shown in FIG. 6A. If the stop timer is not over, step 198 will return the routine also to step 160 in FIG. 6A.

Figure 6E:
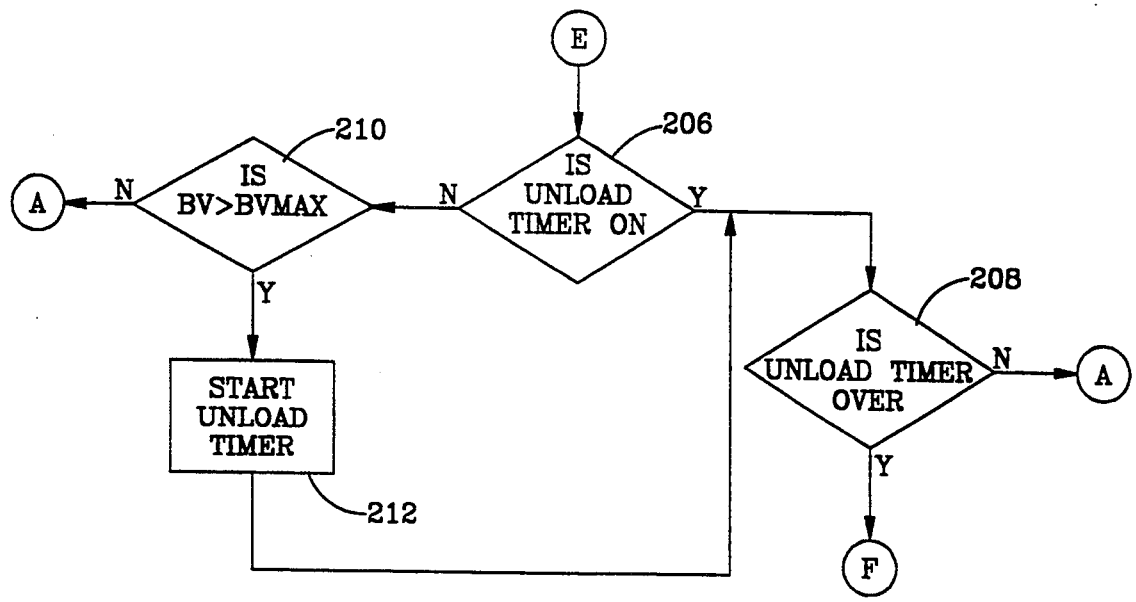

With reference now to FIG. 6E, there is shown the routine which is called into play after an affirmative decision in step 164 shown in FIG. 6A. It may be recalled that step 164 has determined that one or more compressors are operating with their bypass valves open, thus "wasting" air. Compressors which are running with bypass valves open are candidates to be unloaded and possibly removed from the system.

If the result of step 206 is negative, the routine proceeds to step 210 to determine whether the setting of the bypass valve, BV, exceeds a user selectable set point of BV max. If the result of having performed step 210 is in the affirmative, step 212 starts the unload timer which precedes any step to step F, a further step in the unloading of a compressor. If the result in step 210 is negative, the program loops back to step 160 of FIG. 6A.

As shown in FIG. 6E, step 206 determines whether the unload timer is on (and counting to time out). If it is, the routine proceeds to step 208 to determine whether the unload timer has timed out. If it has not, the routine returns to step 160 of FIG. 6A, and if it has, the routine proceeds to step F, to be subsequently described.

Figure 6F:
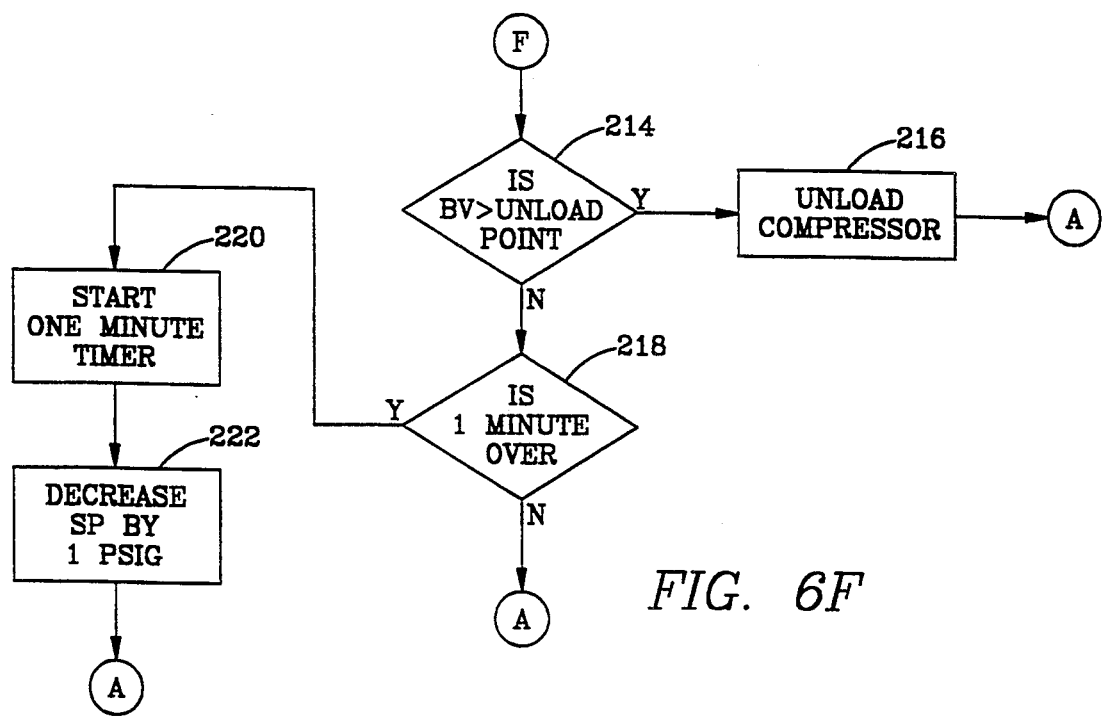

With reference now to FIG. 6F, there shown the routine following an affirmative decision as a result of step 208 shown in FIG. 6E. If the unloaded timer is over, step 208 goes to routine F, which commences with step 214. Step 214 determines whether the bypass valve is set beyond the unload point. If it is, step 216 unloads the compressor and the routine returns to step A, shown in FIG. 6A.

If step 214 has determined that the bypass valve of a particular compressor is set below the unload point, step 218 determines whether a one minute (which may be selectively set by the user to some other time interval) timer is over. If it is not, the routine returns to step A of FIG. 6A, while if the decision is affirmative, step 220 will start a one minute timer, which, upon its timing out, decreases the set point pressure of that particular compressor by 1 psig in step 222. Thereafter, the routine returns to step A shown in FIG. 6A, and continued execution of routine F will eventually put the bypass valve above its unload point so as to result in a yes decision in step 214. It is noted, as previously observed, that the set point pressure for the machine being unload tested at this stage of a compressor process, is reduced by causing its microcontroller to increase the opening of the bypass valve.

Figure 7:
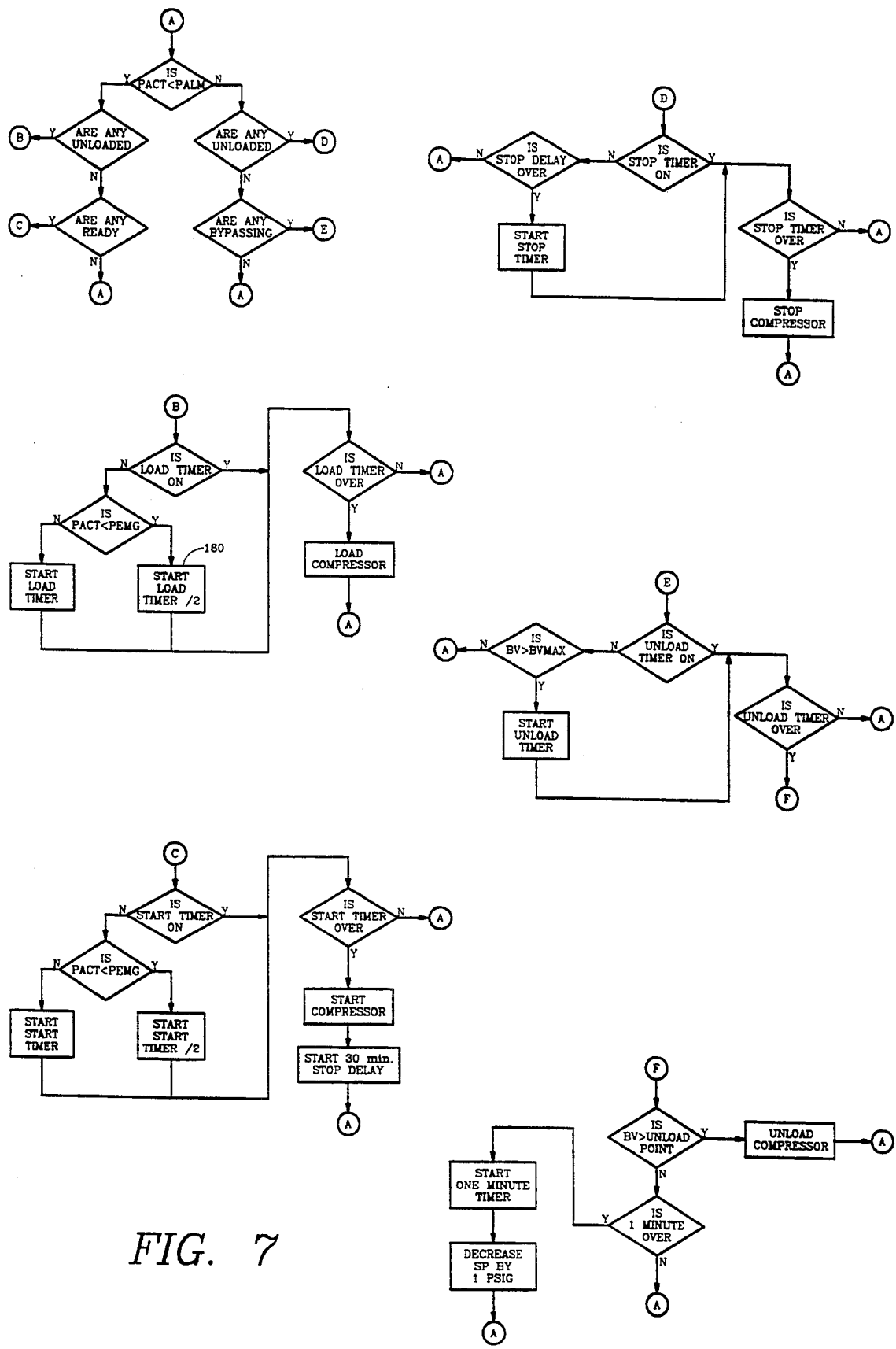
FIG. 7 shows a summary of the flow charts illustrated individually in FIGS. 6A-6F.

With reference to FIG. 7, there are shown all the flow charts with beginning and ending points as shown, and discussed, with reference to FIG. 6A–6F. Essentially, before a compressor is put on line in the system, it must first be started, then loaded (after suitable time delays between each stage), and then, before it is taken off line, it must first be unloaded, and then stop (again with suitable time delays built in). The control system thus adds compressors on line gracefully and gradually, and moves compressors off line, gracefully and gradually.

Figure 8:
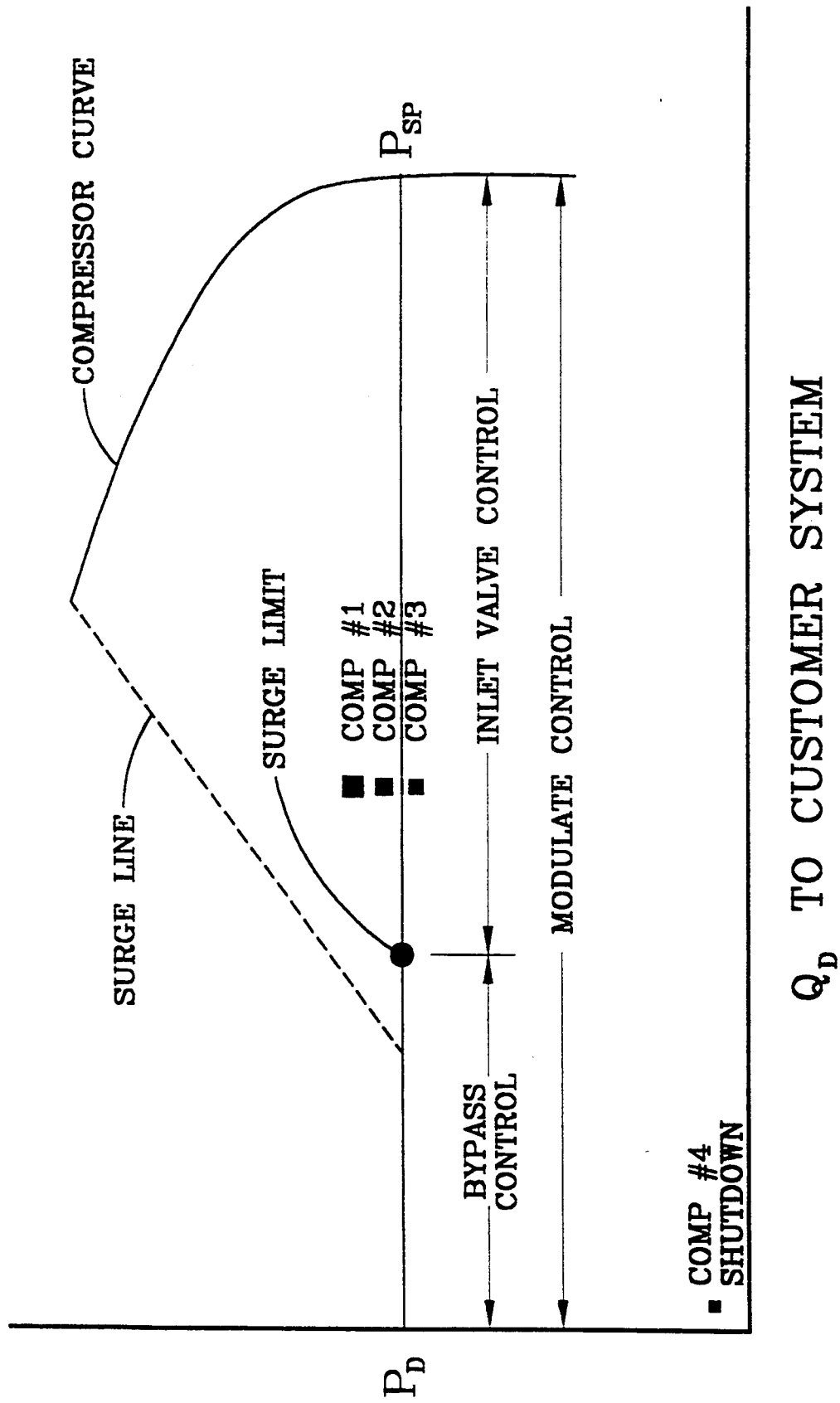
FIG. 8 illustrates the performance of a plurality of compressors controlled in accordance with the control system and method of the invention.

The effect of operating a multi-compressor system in accordance with the method and apparatus of the invention is shown in FIG. 8 which illustrates the pressure (P) as a function of the flow (Q) of a typical compressor system. As shown, with continually decreasing flow delivery to a load, the compressor curve will eventually reach a point of instability shown by the surge line. The surge limit flow point represents the range of control of the inlet valve over the flow of a compressor. Any flow reductions beyond the range of the inlet valve control, are achieved by opening the bypass valve and represents the i.e. region of bypass control. The total range of inlet valve control plus bypass valve control is known as the modulate control range.

It will be appreciated that successive passes through the routine summarized in FIG. 7, and described in FIG. 6A–6F, will have the multiple compressors in a system, for example four, assuming the desirable and efficient operating conditions in which three of them are operating at virtually identical flow rates, while a fourth compressor is totally shut down.

Figure 9:
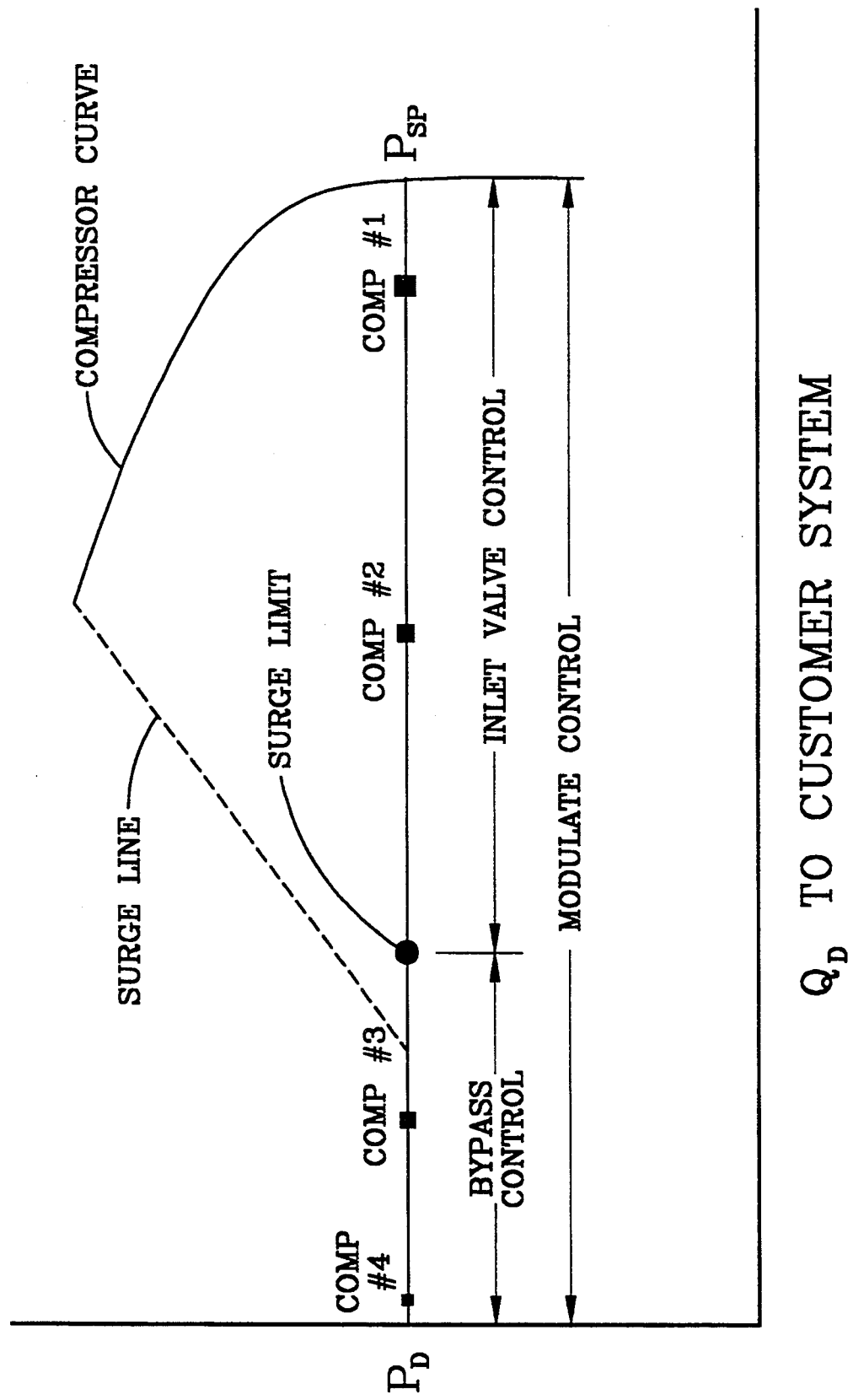
FIG. 9 illustrates the operation of a plurality of compressors without the control system and method according to the invention.

Contrast this with the undesirable situation shown in FIG. 9 in which a multi-compressor system is illustrated again with the same variables described with respect to FIG. 8 but not controlled. As will be noted, four compressors are delivering a composite air flow with several of the compressors being in the bypass region (wasteful region, since air is vented to atmosphere) while two compressors are at widely differing flow conditions. Clearly such a system is inefficient. The point here made after an inspection of FIGS. 8 and 9 can be illustrated by a hypothetical case using typical values.

For example, on some occasions an air system only required 3000 ICFM to satisfy the process demand, however, the two system air compressors are each rated at 1832 ICFM fully loaded (brake horsepower=450) and the compressors can each be throttled to 1568 ICFM (brake horsepower=407).

Case #1—no "Load Sharing", system required 3000 ICFM of air at 125 psig

Unit #1 contributes 1832 ICFM @ 450 Bhp to the system.

Unit #2 contributes 1568 ICFM @ 407 Bhp and bypasses 400 ICFM so system pressure can be maintained.

Total air flow=3400 ICFM with 400 ICFM of bypassed air

Total Bhp required=857 hp

Case #2—"Load Sharing" active, system requires 3000 ICFM of air at 125 psig

Unit #1 contributes 1568 ICFM @ 407 Bhp and bypasses 68 ICFM

Unit #2 contributes 1568 ICFM @ 407 Bhp and bypasses 68 ICFM Total air flow=3136 ICFM with 136 ICFM of bypassed air Total Bhp=814 hp Net results: Case #1 Bhp - 857 hp, bypassed air=4000 ICFM Case #2 Bhp=814 hp, bypassed air=136 ICFM Net Savings with "Load Sharing": 43 Bhp and 264 ICFM of bypassed air!

Figure 10:
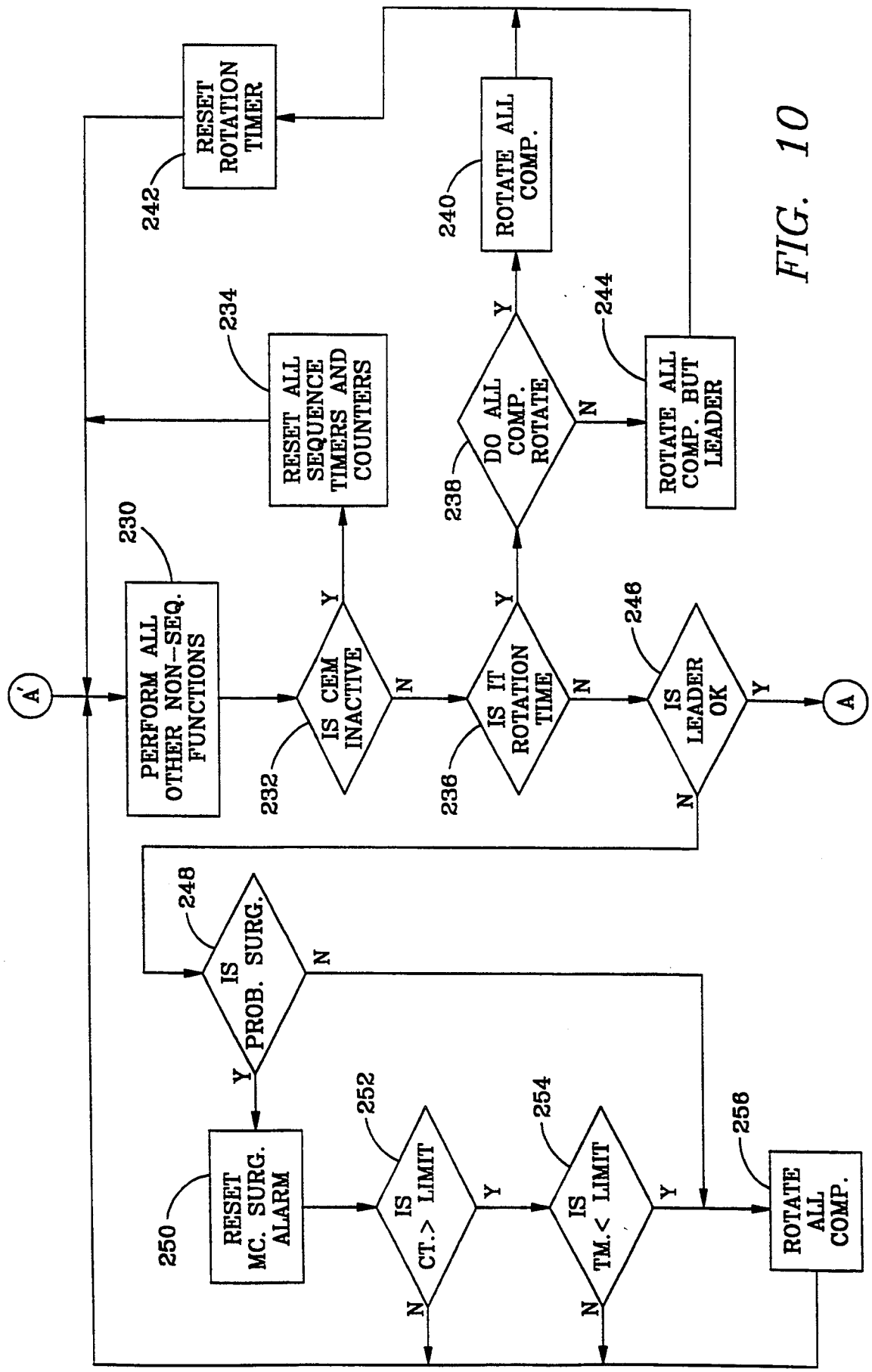
FIG. 10 shows a flow chart including the one for compressor rotation.

With reference to FIG. 10, there is shown a flow chart which illustrates the routine of the program to control, among other things, the rotation of the compressors. The routine commences at step A' and first performs all the nonsequential functions of the program, such as, for example, providing printouts and screen display, etc. in step 230. Thereafter, the routine progresses to step 232 where a status inquiry is made about the activity CEM system. If the CEM system is not active, i.e. inactive, a yes decision results in step 234 being performed which resets all sequence timers and counters. Thereafter, the routine loop back to step 230.

If the decision at step 232 is that the CEM is not inactive (i.e. it is active), the comparison at step 236 inquires whether it is rotation time. This step determines whether the rotation time, which may be set, say, for every midnight, has elapsed. If the decision at step 236 is affirmative, the routine proceeds to step 238 which inquires whether all compressors are to be rotated or whether all compressors except the leading compressor are to be rotated. An affirmative decision at step 238 results in step 240 being performed which rotates all compressors with the leading compressor going to the end of the line and all other intermediate compressors advancing by one to a new position. After step 240 has achieved rotation of all the compressors, the rotation timer is reset at step 242 whereafter the routine loops back to step 230 to begin a new loop.

If the decision at step 238 is negative, the routine proceeds to step 244 which rotates all compressors except the leader which stays the same; thereafter, again the rotation timer is reset at step 240 and the routine loops back to step 230.

If the decision at 236 "is at rotation time" yields a negative decision the routine proceeds to step 246 in which an inquiry is made whether the leader is okay. This ascertains the status of the leading compressor for such items as air temperature, low oil pressure, etc. If any of the criteria for the leading compressor are beyond tolerance levels, a no decision at step 246 leads to a further inquiry at step 248 whether the problem is that the leading compressor is surging.

If the decision at step 248 reveals that there no surge problem, the routine loops to step 256 which rotates all compressors and thereafter commences the routine with step A prime. If the decision at step 248 results in a affirmative determination that there is a surge problem in the leading compressor, the routine proceeds to step 250 which resets the surge alarm on the microcontroller of the compressor after which the routine proceeds to step 252.

In step 252, an inquiry is made about the number of times that the lead compressor has entered a surge mode. This count may be set at the option of the user and if the number of surges encountered is greater than the limit set by the customer, the routine proceeds to step 254 in which the time limit (also user adjustable) during which the number of surges has occurred, is counted. If both steps 252 and 254 show that the lead compressor has surged an unacceptable number of times in a given time interval, the routine proceeds to step 256 which rotates all the compressors and take the leading compressor off-line to have it become the last lagging compressor and the routine loops back to step A'.

A no decision at either steps 252 and 254 will loop the routine back to step A'.

Thus, the routines described with respect to FIG. 10 allow the compressors in a given system to be both rotated, including the leading compressor, and allows the leading compressor to be continually checked for its suitability as a lead compressor.

While the invention has been particularly shown and described with reference preferred embodiments thereof, it will be understood by those skill in the art that changes in forms and details may be made therein with departing from the spirit and scope of the invention, as defined in the claims appended hereto.

What is claimed:

1. A compressed air system comprising:
   a plurality of centrifugal compressors, each one having an inlet valve and a bypass valve;
   means for storing compressed air at a predetermined system pressure, the compressed air storage means being disposed in fluid receiving relation with the plurality of centrifugal compressors;
   at least one control means for controlling a set point pressure for each centrifugal compressor;
   means for sensing the system pressure communicating with the at least one control means;
   means for identifying a predetermined centrifugal compressor to be unloaded from the compressed air system, the identifying means having a logic routine which ranks each centrifugal compressor with respect to the total time of compressor operation, and wherein the logic routine determines the lowest ranked centrifugal compressor having a bypass valve which has a position exceeding the bypass valve maximum position set point, and identifies said centrifugal compressor as the centrifugal compressor to be unloaded; and
   computer means for testing the identified centrifugal compressor to determine whether said centrifugal compressor should be unloaded from the compressed air system, the computer means communicating with the at least one control means and including a timing means which is activated upon identifying said predetermined centrifugal compressor, and whereupon deactivation, the computer means causes the at least one control means to decrease the set point pressure of said compressor until a predetermined test significant event occurs.

2. A compressed air system, as claimed in claim 1, and wherein if during a time period which is determined by the timing means the position of the bypass valve of the identified computer becomes equal to or less than the bypass valve maximum position set point, the timing means is reset.

3. In a compressed air system having a plurality of centrifugal compressors, each one having an inlet valve and a bypass valve, the centrifugal compressors supplying compressed air to a storage vessel at a predetermined system pressure, a method of unloading a predetermined centrifugal compressor from the compressed air system comprising the following steps:
   establishing a pressure set point for each operating centrifugal compressor;
   establishing a bypass valve maximum position for each centrifugal compressor;
   ranking each centrifugal compressor with respect to the total time of compressor operation;
   determining the position of each bypass valve;
   comparing the position of each bypass valve to a respective bypass valve maximum position;
   identifying a centrifugal compressor having the lowest rank and a bypass valve position greater than its bypass valve maximum position as a centrifugal compressor to be unloaded;
   activating a timer having a predetermined timing period upon identifying the centrifugal compressor to be unloaded;
   resetting the timer if at any time during the timing period the bypass valve position of the identified centrifugal compressor is equal to or less than the bypass valve maximum position; and
   upon deactivation of the timer, decreasing the set point pressure of the identified centrifugal compressor in a manner which prevents a surge event from occurring in said compressor.

4. A method, as claimed in claim 3, and wherein the set point pressure of the identified centrifugal compressor is decreased by 1 PSIG per minute until the predetermined test significant event occurs.

5. A method, as claimed in claim 3, and wherein a predetermined test significant event occurs when the bypass valve of the identified compressor is positioned in a predetermined unload position.

6. A method, as claimed in claim 5, further including the step of establishing a system alarm pressure.

7. A method, as claimed in claim 6, and wherein a predetermined test significant event occurs when the compressed air system pressure is less than the system alarm pressure.

* * * * *